(12) United States Patent
Grosman

(10) Patent No.: US 10,986,475 B1
(45) Date of Patent: Apr. 20, 2021

(54) CONSUMABLE PRODUCT STORAGE SYSTEM THAT MONITORS PRODUCT CONSUMPTION

(71) Applicant: Rotem Grosman, Plantation, FL (US)

(72) Inventor: Rotem Grosman, Plantation, FL (US)

(*) Notice: Subject to any disclaimer, the term of this patent is extended or adjusted under 35 U.S.C. 154(b) by 101 days.

(21) Appl. No.: 16/058,283

(22) Filed: Aug. 8, 2018

Related U.S. Application Data

(63) Continuation-in-part of application No. 15/623,955, filed on Jun. 15, 2017.

(51) Int. Cl.
| | |
|---|---|
| *G06Q 30/00* | (2012.01) |
| *H04W 4/35* | (2018.01) |
| *H04W 4/80* | (2018.01) |
| *G01N 21/84* | (2006.01) |
| *G06Q 30/06* | (2012.01) |

(52) U.S. Cl.
CPC .............. *H04W 4/35* (2018.02); *G01N 21/84* (2013.01); *G06Q 30/0603* (2013.01); *H04W 4/80* (2018.02)

(58) Field of Classification Search
CPC ..................................................... G01F 23/00
See application file for complete search history.

(56) References Cited

U.S. PATENT DOCUMENTS

| | | | | |
|---|---|---|---|---|
| 6,204,763 B1* | 3/2001 | Sone | ............... | A47G 29/141 221/2 |
| 2004/0149896 A1* | 8/2004 | Seethaler | ............ | G01F 23/2921 250/223 B |
| 2011/0220800 A1* | 9/2011 | Featonby | ............ | G01F 23/2885 250/357.1 |
| 2012/0314059 A1* | 12/2012 | Hoffmann | ............. | G01F 23/292 348/135 |

(Continued)

OTHER PUBLICATIONS

Hsu, C.F., Smart Pantries for Homes, Oct. 1, 2006, 2006 IEEE International Conference on Systems, Man and Cybernetics, vol. 5, pp. 4276-4283 (Year: 2006).*

*Primary Examiner* — Jeffrey A. Smith
*Assistant Examiner* — Timothy J Kang
(74) *Attorney, Agent, or Firm* — Patents on Demand P.A.; Brian K. Bucheit

(57) ABSTRACT

A consumption-monitoring storage system comprised of consumption-monitoring racks and a control program. The consumption-monitoring racks can have a flat horizontal base and substantially vertical or diagonal sidewalls or siderails. The consumption-monitoring racks can measure the volumetric level of a consumable product for each product container occupying each consumption-monitoring rack. Each product container can have transparent sections or windows positioned opposite each other that provide access to its respective interior volumetric space and the consumable product, allowing measurement of the volumetric level of the consumable product. The control program (Continued)

communicates with the consumption-monitoring racks. The control program can receive volumetric level measurements for each product container and can automatically repurchase consumable products on behalf of and as defined by a human agent responsive to volumetric levels of consumable products in their respective product containers or packaging being reduced to predefined thresholds, which may change over time based on learned consumption behavior.

20 Claims, 6 Drawing Sheets

(56) References Cited

U.S. PATENT DOCUMENTS

| | | | | |
|---|---|---|---|---|
| 2013/0297463 | A1* | 11/2013 | Garber | G06Q 10/087 705/28 |
| 2015/0076025 | A1* | 3/2015 | Wilmers | B65D 25/205 206/459.5 |
| 2015/0178654 | A1* | 6/2015 | Glasgow | G06Q 10/06315 705/7.25 |

* cited by examiner

CONSUMABLE PRODUCT STORAGE SYSTEM THAT MONITORS PRODUCT CONSUMPTION

CROSS-REFERENCE TO RELATED APPLICATIONS

This is a utility application is a continuation in part of U.S. application Ser. No. 15/623,955 filed 15 Jun. 2017 titled "Replenishment Receptacle (Connected Consumer Packaged Goods) For A Consumption And Replenishment System And Process. Through the above application, this utility application also claims priority to U.S. Provisional Applications: 62/354,297 filed Jun. 24, 2016 titled "Consumption Device and Reordering Network for Consumption Device"; 62/365,578 filed Jul. 22, 2016 titled "Repurchase Order Optimization for a Consumption Device"; 62/467,338 filed Mar. 6, 2017 titled Leveraging Consumer Relationships for Consumption Device Repurchases; and 62/516,699 filed Jun. 8, 2017 titled "A Replenishment Receptacle (Connected Consumer Packaged Goods) for a Consumption and Replenishment System and Process."

The entire contents of each and every one of the above utility and provisional applications are incorporated by reference herein in their entirety.

BACKGROUND

The present invention relates to the field of product storage systems, and more particularly to a consumable product storage system that monitors product consumption.

Most households keep a small stock of household consumable products, such as food, detergents, and beverages, on hand in a household location like a pantry or storeroom. In order to maintain a desired level of consumable products in the pantry or storeroom, the consumer (i.e., household owner or member) must check the current amount of each consumable product to decide when to repurchase the consumable product. The more consumable products kept in the pantry, the more time is spent by the consumer to determine when a product needs to be repurchased.

In an effort to assist consumers with replenishing their stores of consumable products, many online marketplaces allow the consumer to establish a recurring order for a consumable product. These recurring shipments occur on a preset time frame without concern for the consumer's actual consumption of the consumable products. Thus, conventional recurring order that ship automatically on a set schedule often result in the consumer having too little or too much of the consumable product.

What is needed is a solution that monitors the levels of consumable products in real-time and automatically repurchases a consumable product when its available quantity is reduced to a predefined threshold. Such a solution would be easy-to-use and monitor a variety of different types of consumable products.

BRIEF SUMMARY

One aspect of the present invention can include a consumption-monitoring storage system comprised of one or more consumption-monitoring racks and a control program. The one or more consumption-monitoring racks can have a flat horizontal base and substantially vertical or diagonal sidewalls or siderails. The one or more consumption-monitoring racks can measure a volumetric level of a consumable product for each product container occupying each consumption-monitoring rack. Each product container can have two or more transparent sections or windows positioned opposite each other that provide access to its respective interior volumetric space and the consumable product, allowing measurement of the volumetric level of the consumable product within the interior volumetric space by volume-sensing components. The control program can run on a computing device that is located proximate to and configured to communicate with the one or more consumption-monitoring racks. The control program can receive volumetric level measurements for each product container occupying the one or more consumption-monitoring racks and can automatically repurchase consumable products on behalf of and as defined by a human agent responsive to volumetric levels of consumable products in their respective product containers being reduced to predefined thresholds. In one embodiment, the predefined thresholds are not static values in that they are adjusted over time in accordance with consumption behavior to ensure product being monitored is purchased and delivered before being expended. For example, if an initial threshold is established for a "standard" consumer of a product and typical consumption behavior and the system learns the consumption behavior of a user is greater than typical, the threshold will be adjusted to ensure ordering happens more rapidly than normal.

Another aspect of the present invention can include a consumption-monitoring storage system comprised of one or more consumption-monitoring racks and a control program. The one or more consumption-monitoring racks can have a flat horizontal base and substantially vertical or diagonal sidewalls or siderails and can be installed within a household location. A consumption-monitoring rack can include product compartments, pairs of sensor fins, a product identification system, and a control module. The product compartments can define discrete sections of the horizontal base. Each product compartment can be of a size and a shape to hold a product container of a similar size and shape. Each product container can have two or more vertical transparent sections or windows positioned opposite each other that provide access to its respective interior volumetric space and a consumable product stored therein. A pair of sensor fins for each product compartment can be vertically coupled to the horizontal base and positioned opposite to each other. Each pair of sensor fins can house consumption sensors for measuring a volumetric level of the consumable product within the product container that occupies a respective product compartment, between the pair of sensor fins. The consumption sensors can be aligned with the transparent sections or windows of the product container. The product identification system can be installed upon or within the base and can be configured to access identifying data encoded in a product identifier present on each product container to identify the consumable product stored therein. The identifying data can include the name of the consumable product. The control module can be installed within the horizontal base and/or vertical or diagonal sidewalls or siderails of the consumption-monitoring rack. The control module can monitor the volumetric levels of consumable products within the product containers that occupy the product compartments. The control module can be capable of wireless communication. The control program running on a computing device located proximate to the one or more consumption-monitoring racks so as to effectuate wireless communications between the control module and the computing device. The control program can receive volumetric level measurements for each product container occupying the one or more consumption-monitoring racks and can automatically repurchase consumable products, as identified by the product identification system, on behalf of and as defined by a human agent responsive to the volumetric levels of consumable products in their respective product containers being reduced to predefined thresholds. This threshold is adjusted over time in embodiments based on user-specific product consumptions.

Yet another aspect of the present invention can include a consumption-monitoring rack comprised of a flat horizontal base with substantially vertical or diagonal sidewalls or siderails, product compartments, pairs of sensor fins, a product identification system, and a control module. The product compartments can define discrete sections or windows of the horizontal base. Each product compartment can be of a size and a shape to hold a product container of a substantially commensurate size and shape. Each product container can have two or more vertical transparent sections or windows positioned opposite each other that provide access to its respective interior volumetric space and a consumable product stored therein. A pair of sensor fins for each product compartment can be vertically coupled to the horizontal base and can be positioned opposite to each other. Each pair of sensor fins can house consumption sensors for measuring the volumetric level of the consumable product within the product container that occupies a respective product compartment, between the pair of sensor fins. The consumption sensors can be aligned with the transparent sections or windows of the product container. The product identification system can be installed upon or within the base and can be configured to access identifying data encoded in a product identifier present on each product container to identify the consumable product stored therein. The identifying data can include the name of the consumable product. The control module can be installed within the horizontal base and/or vertical or diagonal sidewalls or siderails and can monitor volumetric levels of consumable products within product containers that occupy the product compartments. The control module can be capable of wirelessly conveying the volumetric levels to a computing device running a control program. The control program can automatically repurchase consumable products, as identified by the product identification system, on behalf of and as defined by a human agent responsive to the volumetric levels of the consumable products in their respective product containers being reduced to predefined thresholds. The predefined thresholds are automatically adjusted over time based on learned user consumption behavior.

DETAILED DESCRIPTION

Figure 1:
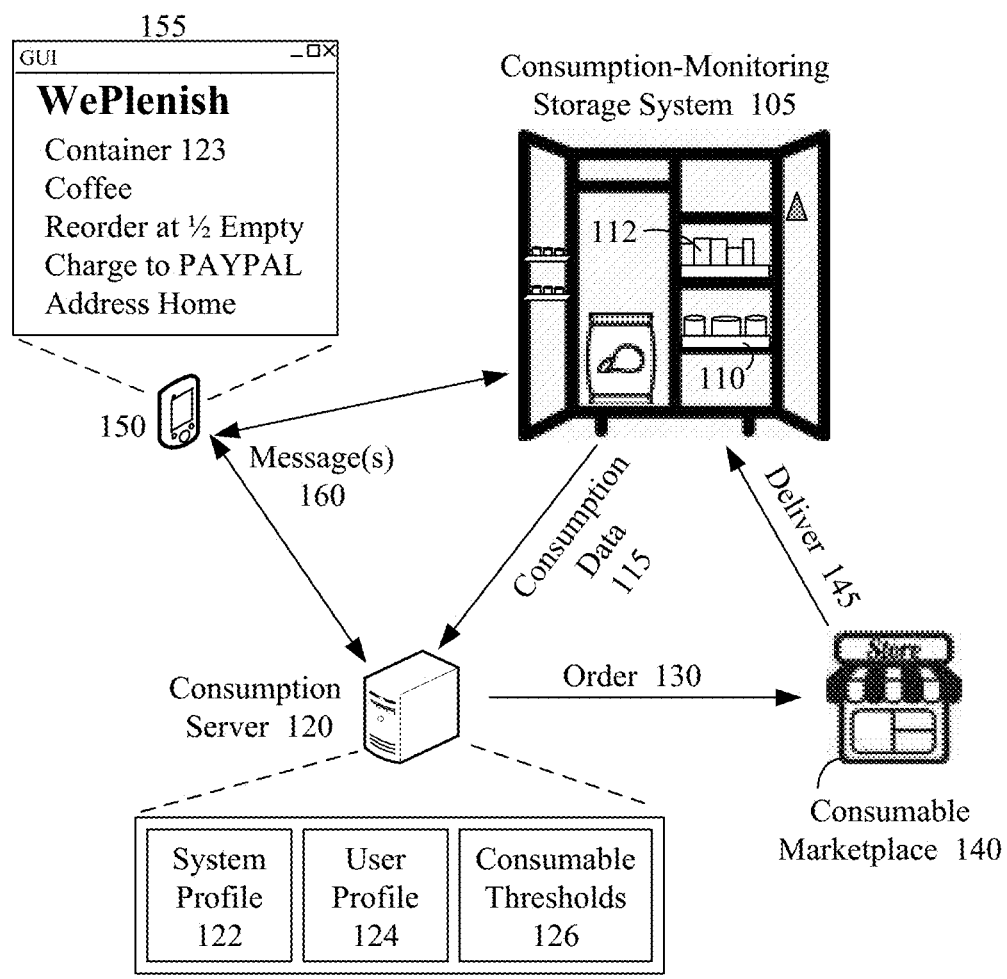
FIG. 1 is an interaction diagram for a system using a consumption-monitoring storage system in accordance with embodiments of the inventive arrangements disclosed herein.

Embodiments of the disclosed invention can describe a solution for storage system that automatically monitors the levels of stored consumable products and repurchases the consumable products when the monitored level is reduced to a predefined threshold. A consumption-monitoring storage system, referred to as the consumption system, can be comprised of one or more consumption-monitoring racks and a control program running on a separate computing device. The consumption-monitoring racks can have a flat horizontal base and substantially vertical or diagonal sidewalls or siderails. The consumption-monitoring racks can use consumption sensors to measure the volumetric level of a consumable product for each product compartment occupying each rack. Each product container can have transparent sections or windows positioned opposite each other that provide access to its respective interior volumetric space that are aligned with the consumption sensors. The computing device can be located proximate to or remotely and configured to communicate with the consumption-monitoring racks. The control program can receive the volumetric level measurements for each product container and determine when the measured volumetric level of a consumable product is reduced below its predefined threshold. When the volumetric level is below the predefined threshold, the control program can automatically repurchase consumable products on behalf of its associated human agent. The predefined threshold can vary based on learning consumption behavior over time. That is, the system learns the device consumption rate over time and orders accordingly, which involves resetting the predefined threshold for consumer behavior. The threshold still exists and is still predefined, but is not necessarily a static input number, but can be one designed to be altered with use.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is an interaction diagram for a system 100 using a consumption-monitoring storage system 105 in accordance with embodiments of the inventive arrangements disclosed herein. In system 100, the consumption-monitoring storage system 105, herein referred to as the consumption system 105, can represent one or more racks 110 designed and configured to monitor the consumption of the consumable products contained within the product containers 112 that occupy the racks 110.

A product container 112 can be a container or packaging that stored a quantity of a consumable product. A packaging need not contain the consumable product, which can be stored inside a sub-container to which the packaging is attached. The product containers 112 can be of a variety of sizes and/or shapes. As used herein, the term "consumable product" can refer to an item that is removed from its product container 112 over time by a user of the consumption system 105. For example, the consumable product can be edible and eaten by a user over time like cookies. As another example, the consumable product can be motor oil that the user pours out of its product container 112 for consumption by a car engine.

The racks 110 of the consumption system 105 can be positioned within a cabinet, on a shelf, on the floor, in a hanging cradle, or any in other space and/or using a positioning means that is commonly known in the Art for storage and/or organizational systems. Examples of the location where the consumption system 105 can be installed can include, but are not limited to, a cabinet or shelves in a kitchen, a pantry, a cabinet or shelves in a laundry room, a cabinet or shelves in a garage, a cabinet or shelves in a pet area, a cabinet or shelves in a livestock area, a storeroom of an office, hotel, or restaurant, and the like.

The racks 110 of the consumption system 105 can collect consumption data 115 about the consumable products in the product containers 112. The consumption data 115 can represent data related to the consumption of the consumable products like a volumetric measurement of consumable product within a product container 112, as well as other data captured by the consumption system 105, which varies based upon the capabilities of the specific consumption system 105 implementation. Examples of "other data" can include, but are not limited to, identifying data about a consumable product and/or product container 112, weight data for a product container 112, temperature data, humidity data, location/position data, malfunction errors, and the like.

The consumption data 115 collected by the consumption system 105 can be conveyed to a remotely-located consumption server 120 either directly or through a communication intermediary, such as WIFI, GPRS, BLUETOOTH, and the like. In some embodiments, the consumption system 105 can receive queries, requests, and/or other communications from the consumption server 120 over this communication linkage.

The consumption server 120 can represent the hardware and/or software components necessary to perform defined operations based upon the received consumption data 115. The functionality of the consumption server 120 can vary based on implementation (i.e., only specific functions are available in each implementation) and/or as purchased by a user of the consumption system 105 (i.e., the user pays to access only a subset of the available functions).

Base functionality of the consumption server 120 can be to monitor the consumption data 115 for all the consumable products and/or product containers 112 and automatically order 130 (e.g., repurchase) those consumable products whose consumption has resulted in the amount of consumable product being reduced to a corresponding threshold value 126. A consumable threshold 126 can represent the maximum amount of consumable product within the product container 112 that triggers the consumption server 120 to order 130 the consumable product. The consumption threshold 126 can be automatically adjusted over time based on learned consumer behavior. That is, usage of a product by a consumer is monitored, in embodiments, to determine a rate of consumption or a predicted rate of consumption, which is used to adjust the consumable threshold 126 to ensure products are reordered and delivered before being expended or "running out".

For example, a box 112 of popped rice cereal can have a consumable threshold 126 of 30%. When the consumption data 115 indicates that the current volume of the popped rice cereal in the box 112 is 27%, the consumption server 120 can order 130 another box 112 of the popped rice cereal from a specified consumable marketplace 140. As long as the volume of the popped rice cereal remains above 30%, the consumption server 120 continues to monitor the consumption data 115 from the consumption system 105. If a particular user consumes little popped rice cereal over time, the consumption threshold 126 can be automatically reduced to 20%, as that quantity is sufficient to last until a new box 112 is reordered. If a particular user consumes large quantities popped rice cereal over time, the consumption threshold 126 can be automatically increased to 45%, as that quantity is sufficient to last until a new box 112 is reordered.

It should be understood that the consumption system 105 can compute the consumption threshold 126 and container 112 volume in numerous manners for re-ordering. In one embodiment, a daily change in level is computed, which is correlated for different days of the week, as consumptions often change based in a daily cyclic manner. For example, it is common for a home owner to consume a first quantity of K-Cups during a weekday and a different quantity on weekends, due to routine. In one embodiment, the consumption threshold can be set at 5 days from expiration, which inherently has a number of variables associated as computed by the consumption system 105. Using days as a threshold or other consumption variable value inherently focuses on consumption instead of volume of product, which is preferable in embodiments. In a given situation, a customer can fill up a container 112 at 100% initially. The consumption system 105 can be aware that a full container 112 is consumed on average within seven days. On the first day, 25% may be consumed; after 3 days 50%; after six days the level can be at 25%. Knowing the level of volume consumed per day (with some variation for weekdays and weekends), the algorithm used by the consumption system 105 can accurately predict the re-order time for different products. It should be noted that some containers 112 used are tapered in embodiments. Thus, the volume per linear (measured vertically) length of the container may not be uniform. That is, the container itself (or the sensors reading volume) can be arranged to "narrow" as capacity diminishes (as viewed through the window or transparent container linearly). Similarly, a "reserve" can be established by having a terminal portion of the container flange outwardly to increase the volume at the base of the unit. Use of non-linear (sloping) volumetric container 112 is significant as end-user perceived consumption and re-ordering has a substantial impact on consumer satisfaction. That is, end-users are often more satisfied with automatic re-ordering at a time when a perceived diminution of product occurs, which can be intentionally biased to maximum perception and customer satisfaction though intelligent selections in container 112 shape.

Data, including a system profile 122, user profile 124, and the consumable thresholds 126, used by the consumption server 120 can be provided automatically from the consumption system 105 via the consumption data 115 and/or from a user of the consumption system 105 via messages 160 from a computing device 150 running a control program 155 for the consumption system 105. The system profile 122 can define general data about the consumption system 105 including, but not limited to, a quantity and/or configuration of the racks 110, available components, identifiers for each rack 110, product container 112, and consumable product, network configuration, and the like.

The user profile 124 can contain data specific to one or more users associated with the consumption system 105. The data in the user profile 124 can include, but is not limited to, the user's name, identification information for the computing device 150, the user's address, shopping preferences, repurchase preferences, billing information, and the like.

In other embodiments, the user profile 124 can allow the user to define variations with respect to repurchasing a consumable product. The variations can be expressed as data values or collections of data values to allow the user to indicate a level of variability for the consumable product with regard to brand, type, flavor, size, color, and other characteristics. For example, a user can define the specific brands of the consumable product that the consumption server 120 is allowed to consider when repurchasing.

In another contemplated embodiment, different price preferences can be established for the consumable products within the user profile 124 to establish a price versus preference balance that the consumption server 120 can utilize when generating an order 130. For example, the user profile 124 can express that the consumption server 120 is authorize to repurchase a different brand, from a list of acceptable brands, of the consumable product if the price of the preferred brand increases by 25% over its previous purchase price.

In yet another embodiment, instead of explicit profiles 122, 124, and 126, a general account can be established by the consumption server 120 for the consumption system 105. The account can store all the user's data and preferences related to the consumption system 105, racks 110, consumable products, and other data that would be contained in the profiles 124, 126, and 128.

Additional functions of the consumption server 120 can include, but are not limited to, calculating the rate at which the consumable product is consumed over time to predict exhaustion, identifying the most cost-effect method and/or service for delivering 145 the consumable product, economically optimizing order 130 generation and fulfillment for multiple consumable products (e.g., combining orders 130, bulk orders 130, etc.), and the like.

The computing device 150 can represent a variety of electronic devices capable of running the control program 155 and exchanging messages 160 with the consumption system 105 and/or consumption server 120. The control program 155 can be a software application that allows the user to configure the consumption system 105 by adding and/or modifying the data that comprises the system profile 122, user profile 124, and the consumable thresholds 126.

Additionally, the control program 155 can allow the user to view the consumption data 115 for their consumption system 105. In this example, the control program 155 can present the user with information for a specific product container 112 (Container 123), indicating the type of consumable product in the container 112 (coffee), the consumable threshold 126 for repurchase (e.g., ½ empty or 50%), the means of payment for repurchase (PAYPAL), and the address (home) where ordered 130 consumable products will be delivered 145.

In one embodiment, for example, the consumption server 120 may convey a message 160 to the user of device 150 to authorize replenishment of the consumable product. In other embodiments, the consumable product can be replenished automatically without user involvement.

When repurchase of a consumable product is required, the consumption server 120 can submit an order 130 or set of orders 130 to one or more consumable marketplaces 140. The marketplace(s) 140 can be any source of a desired consumable product. The consumable marketplace 140 can represent a local store, an online store, a direct manufacturing source, a reseller, and the like. Orders 130 can result in the consumable product being shipped and delivered 150 in a timely fashion to the user-specified address. User-specific consumable marketplace 140 relationships, such as having an AMAZON PRIME membership, which allow for discounts on shipping, can be considered by the consumption server 120 when placing the orders 130.

In one embodiment, the consumption server 120 can be capable of establishing recurring order 130 relationships with a consumable marketplace 140 that are modifiable by the real-time consumption data 115 from the consumption system 105. Unlike conventional recurring orders 130 that receive ship on a specified schedule regardless of the actual consumption of the consumable product, the consumption server 120 can adjust the shipping/delivery 145 date of the order 130 to account for how the user is currently consuming the consumable product.

For example, the user can be a coffee drinker and the consumption server 120 can have a standard recurring order 130 for coffee to be delivered 145 at the first of every month. However, by the $23^{rd}$ of the month, the coffee container 112 can be two-thirds full as the user has been out of town on a business trip; not enough coffee consumed to trigger repurchase. The consumption server 120 can push back the shipping date of the recurring order 130 by a week or reduce the amount of the existing order 130. The variance of these changes can be based upon the user's historical consumption data 115.

Figure 2:
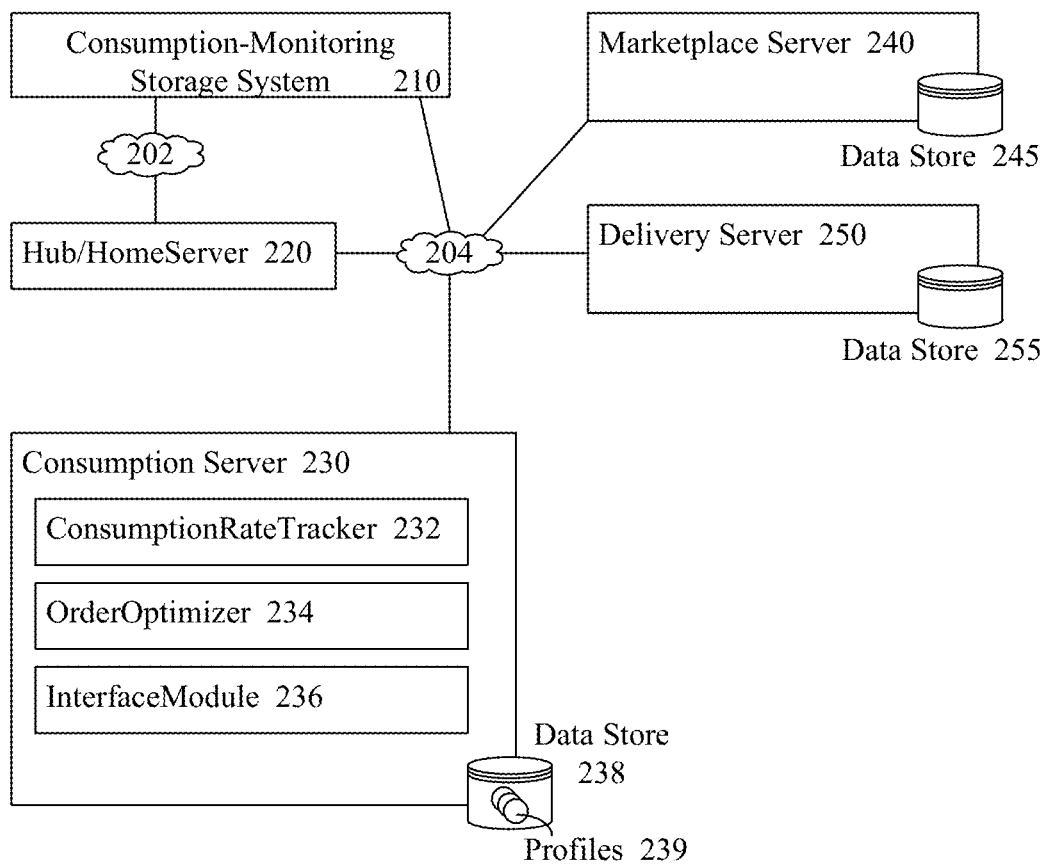
FIG. 2 is a block diagram of a system for implementing the consumption system and consumption server in accordance with embodiments of the inventive arrangements disclosed herein.

FIG. 2 is a block diagram of a system 200 for implementing the consumption system 210 and consumption server 230 in accordance with embodiments of the inventive arrangements disclosed herein. In system 200, the consumption system 210 can connect to a local hub and/or home server 220 via a personal area network (PAN) 202. The PAN 202 can be a communications network that is localized to a relatively small geographic area where the racks of the consumption system 210 are located. For example, the PAN 202 can be a BLUETOOTH connection between the consumption system 210 and the hub and/or home server 220.

The hub/home server 220 can represent the hardware and/or software components that acts as a communications intermediary between the PAN 202 and a larger communication network 204. The hub/home server 220 can be a simple communications gateway. In other embodiments, the hub/home server 220 can be a messaging or communications server or other dedicated computing device configured to perform additional operations on the messages sent from and/or received by the consumption system 210, such as encryption/decryption. In another embodiment, the PAN 202 and hub/home server 220 can represent an Internet of Things (IoT) network.

Additionally or alternatively, the consumption system 210 can directly connect to network 204 (such as through WiFi or a cellular service), to which the consumption server 230, marketplace server 240, and/or delivery server 250 are also connected. In this manner, information can be exchanged between these devices, which are remotely-located from each other.

Consumption server 230 (described in FIG. 1 as consumption server 120) can be a server comprised of hardware and software including, but not limited to, one or more processors, circuitry, transceivers, user interface, data storage units, and the like. The consumption server 230 can be a dedicated machine and/or can be a virtual machine implemented on top of a platform. The consumption server 230 can be a cloud-based server in one embodiment, such as an AMAZON CLOUD SERVER, where the functions of the consumption server 230 are performed as cloud services.

The consumption server 230 can include a consumption rate tracker 232, an order optimizer 234, an interface module 236, and a data store 238 within which a set of profiles 239 are stored. The profiles 239 can include those described in FIG. 1 like a system profile 122, user profile 124, consumable thresholds 126, and the like.

Each of these components 232, 234, and 236 can include circuitry, processors, firmware, and/or software, as defined herein. Functions of one or more of these components 232, 234, and 236 can be performed in an alternative device, such as the consumption system 210, hub/home server 220, marketplace server 240, or delivery server 250, while still being within the contemplated scope of the disclosure.

The consumption rate tracker 232 can track volumetric changes in the product containers of the consumption system 210 over time to determine the rate at which the consumable product is being consumed/used. This rate of consumption can be used to predict a time or time period when the consumable product will be completely consumed; it can be desired that additional units of the consumable product be ordered prior to this predicted time. Information from the consumption rate tracker 232 can be used to aromatically adjust the consumption threshold established for reordering a product.

In one embodiment, the consumption rate tracker 232 can also factor in the difference between the volume of a consumable product stored in the consumption system 210 and an amount of the purchased consumable product. For example, a product container of the consumption system 210 may hold fifty K-CUPS. K-CUPS can typically be purchased in boxes of sixteen, eighteen, forty-eight, and seventy-two, depending on brand and type. A box of forty-eight K-CUPS can be almost enough to fill the product container at once. However, if the K-CUPS have a high consumption rate, it can be more economical and require less frequent reordering to use the seventy-two count box.

In another example, if the product containers are not the original packaging of the consumable product like a TUPPERWARE or jar-like container, the consumption server 230 can prompt the user to "refill" a product container with the consumable product. For example, a product container of breakfast cereal can be reduced to half volume.

Since a full box is the purchasable unit of cereal, not half, and if another box of cereal is not already stored in the consumption system 210, the consumption server 230 can send the user a smartphone notification, text message, or an email (message 160 of system 100). Prompts to refill the product container using the other available box can continue until the refill is performed. Once the available supply, the second box, for refilling the product container is exhausted, the consumption server 230 can continue with repurchasing the box of cereal.

In another embodiment, instead of prompting the user, the consumption server 230 can "remember" an amount of product previously ordered and can assume that any excess remains within the container, should any exist.

The order optimizer 234 can optimize the ordering of consumable products for the consumption system 210 to lower an overall cost or to maximize/balance a competing set of factors. For example, various options may exist for reordering a consumable product from different marketplace servers 240. The different marketplace servers 240 can have different unit costs, discounts, shipping costs (tied to the marketplace), and the like. Different delivery services, from one or more delivery servers 250, can also have different price points and/or restrictions for delivering to different geographic regions, different types of addresses (e.g., APO, P.O. box, FPO), and different types of consumable products. The order optimizer 234 can balance all of these variables to minimize the overall costs for the orders necessary to fill the product containers of the consumption system 210 within a certain time frame (i.e., to ensure that the supply of consumable products is not exhausted).

The interface module 236 can facilitate user interaction with the consumption server 230. This can be utilize a variety of accepted technologies and/or approaches including, but not limited to, a Web server interface, an application interface (API), a cloud service architecture, a client-server architecture, and the like. In some embodiments, the interface module 236 can act as a proxy to allow the user to configure and/or monitor the consumption system 210.

The marketplace and delivery servers 240 and 250 can represent the hardware and software components that support server-side functions for a consumable marketplace and a delivery service. Each of these servers 240 and 250 can utilize a corresponding data store 245 and 255 for maintaining a variety of data regarding users and/or orders.

For example, the marketplace server 240 can be an online store component for a brick-and-mortar business or an online-only store. The delivery server 250 can correspond to the server that the marketplace server 240 communicates with to schedule delivery of the consumable product to the user like UPS or FEDEX.

As used herein, presented data stores 238, 245, and 255 can be a physical or virtual storage space configured to store digital information. Data stores 238, 245, and 255 can be physically implemented within any type of hardware including, but not limited to, a magnetic disk, an optical disk, a semiconductor memory, a digitally encoded plastic memory, a holographic memory, or any other recording medium. Data stores 238, 245, and 255 can be a stand-alone storage unit as well as a storage unit formed from a plurality of physical devices. Additionally, information can be stored within data stores 238, 245, and 255 in a variety of manners. For example, information can be stored within a database structure or can be stored within one or more files of a file storage system, where each file may or may not be indexed for information searching purposes. Further, data stores 238, 245, and/or 255 can utilize one or more encryption mechanisms to protect stored information from unauthorized access.

Networks 202 and 204 can include any hardware/software/and firmware necessary to convey data encoded within carrier waves. Data can be contained within analog or digital signals and conveyed though data or voice channels. Networks 202 and 204 can include local components and data pathways necessary for communications to be exchanged among computing device components and between integrated device components and peripheral devices. Networks 202 and 204 can also include network equipment, such as routers, data lines, hubs, and intermediary servers which together form a data network, such as the Internet. Networks 202 and 204 can also include circuit-based communication components and mobile communication components, such as telephony switches, modems, cellular communication towers, and the like. Networks 202 and 204 can include line based and/or wireless communication pathways.

Figure 3:
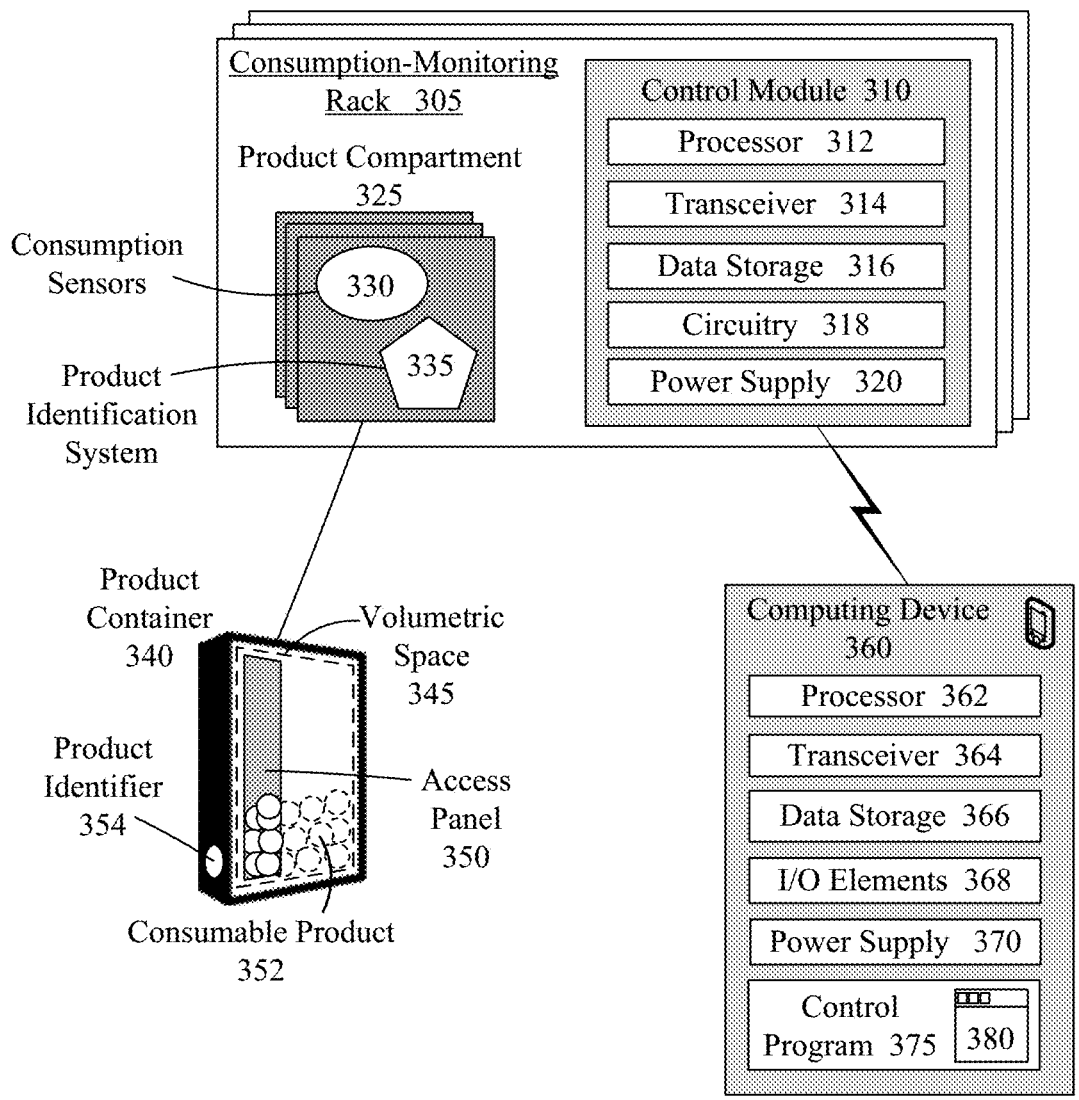
FIG. 3 is a functional block diagram of a consumption system in accordance with embodiments of the inventive arrangements disclosed herein.

FIG. 3 is a functional block diagram of a consumption system 300 in accordance with embodiments of the inventive arrangements disclosed herein. Consumption system 300 can be utilized within the context of system 100. Consumption system 300 can be comprised of one or more consumption-monitoring racks 305 for holding product containers 340 and a computing device 360.

A consumption-monitoring rack 305 can be comprised of multiple product compartments 325 and a control module 310. A product compartment 325 can represent a discrete section of the consumption-monitoring rack 305 for holding/storing a similarly-sized and shaped product container 340 (i.e., rectangular boxes 340 are placed in rectangular product compartments 325, bottles 340 in circular or cylindrical product compartments 325, etc.). Each product compartment 325 can include consumption sensors 330 and a product identification system 335.

The consumption sensors 330 can represent a variety of electronic elements for measuring the relative volume and/or quantity of the consumable product 352 contained within the product container 340 that occupies each product compartment 325. Various types of consumption sensors 330 can be contemplated and can vary from embodiment to embodiment based on design requirements. Examples of consumption sensors 330 can include, but are not limited to, weight sensors, beam-breaking sensors, visual sensors like a camera, pressure sensors, motion sensors, light sensors, emission reflection sensors, ultrasonic sensors, and the like.

The product identification system 335 can represent the hardware and/or software components necessary to capture and/or decode product information that is encoded within a product identifier 354 on the product container 340. Examples of the product identification system 335 and their companion product identifier 354 can include, but are not limited to, a bar code reader and a bar code, a radio-frequency identification (RFID) reader and an RFID tag, a near-field communications (NFC) device that reads a NFC sticker or tag, and the like.

In another contemplated embodiment, the consumption-monitoring rack 305 can utilize a single product identification system 335. That is, the product identification system 335 can be a component of the consumption-monitoring rack 305 and not a component of each product compartments 325. Such an embodiment can reduce the amount of resources required to support operation of multiple product identification systems 335.

In yet another embodiment, the product identification system 335 can be omitted and information about the product container 340 and/or consumable product 352 can be manually entered by the user via the computing device 360.

The product container 340 can be designed to store a consumable product 352, solid, liquid, or sealed gas, within an interior volumetric space 345. The product container 340 can be the original packaging of the consumable product 352 or a secondary "generic" container that the consumable product 352 is transferred to from its original packaging. The product container 340 can also include one or more access panels 350.

The one or more access panels 350 can be transparent sections or windows of the product container 340 that allow the level of the consumable product 352 within the volumetric space 345 to be ascertained by the consumption sensors 330. The size, shape, and position of the access panels 350 on the product container 340 can be commensurate with the size, shape, and position of the consumption sensors 330.

The control module 310 can represent the hardware and/or software components that governs operation of the consumption-monitoring rack 305. The control module 310 can include a processor 312, a transceiver 314, data storage 316, circuitry 318, a power supply 320, and the like that are interconnected via a data bus. The data bus can be a wired, printed, and/or wireless communication channel.

The processor 312 can be a microprocessor capable of executing programmatic instructions (firmware or software) to cause elements of the consumption-monitoring rack 305 or control module 310 to perform one or more actions. The transceiver 314 can be replaced with a transmitter in embodiments where the consumption-monitoring rack 305 does not receive external communications. The transceiver 314 can utilize BLUETOOTH, WIFI, LIFI, ZIGBE, Wireless USB, and/or other accepted wireless communication protocols. Multiple transceivers 314 for different types of communication networks can be used to provide resiliency in case of outages.

The data storage 316 can be a non-transitory storage medium for persistent data like the programmatic instructions for the processor 312. The data storage 316 can be a removable or a fixed medium. The type of data stored within the data storage 316 can vary based on embodiment. The circuitry 318 can include the printed circuit board, wires, transistors, resistors, ports, and the like that are used to support and/or connect the various electronic components of the consumption-monitoring rack 305.

The power supply 320 can represent the means by which the electronic components of the consumption-monitoring rack 305 are powered. Typically, the power supply 320 can be a battery, though other means are contemplated such as plugs for household electrical outlets.

In a more robust embodiment, the control module 310 can also include a user interface, which may include one or more buttons, a display panel, one or more switches, one or more knobs, one or more signal lights, speakers, and the like.

This embodiment of the consumption system 300 can include a computing device 360, as opposed to the computing device 150 of system 100 that belonged to the user and is usable with consumption system 105. Computing device 360 can function similarly to the device 150 described in system 100, except that computing device 360 can be configured to only perform functions associated with the consumption system 300, unlike a typical user device. For example, consumption system 300 can be installed within a kitchen pantry with the consumption-monitoring racks 305 located on the pantry shelves and a smartphone computing device 360 that is installed in a holder on a wall of or near to the pantry.

The components of the computing device 360 can be as known in the Art for comparable electronic devices like smartphones and tablet computers. Computing device 360 can include components like a processor 362, a transceiver 364, data storage 366, input/output (I/O) elements 368, a power supply 370, control program 375, and the like that are interconnected via a data bus. The data bus can be a wired, printed, and/or wireless communication channel.

The processor 362 can be a microprocessor capable of executing programmatic instructions (firmware or software) to execute programmatic instructions from the data storage 366 that cause other components of the computing device 360 to operate. The transceiver 364 can represent the means by which the computing device 360 wirelessly communicates with the control module 310 and consumption server (not shown). Multiple transceivers 364 can be required, not only for resiliency, but also to match communication protocols with the control module 310 and an external network. For example, a BLUETOOTH transceiver 364 can be used to communicate with the control module 310 and a WIFI transceiver 364 to connect to the user's home network and communicate with the remotely-located consumption server.

The data storage 366 can be a non-transitory storage medium for persistent data. The data storage 316 can include removable and/or fixed media. The I/O components 368 can represent the elements that are used to by the user to interact with the computing device 360 and control program 375 and can vary based upon the specific computing device 360. Examples of I/O components 368 can include, but are not limited to, a display, a touchscreen, buttons, switches, speakers, a microphone, a camera, and the like.

The power supply 320 can represent the power source of the computing device's 360 electronic components. The power supply 320 can be removable and/or rechargeable like a battery or permanent like a plug for a household electrical outlet.

The control program 375 can be a software application that interacts with the control module 310 to configure operation of and process the consumption data provided by the consumption-monitoring rack 305. The control program 375 can include a user interface 380 that utilizes the I/O components 368 to receive data inputted by and present data to the user. The user interface 380 can be written using the applicable standards and practices as are known in the Art that are commensurate with the specific type of computing device 360.

Figure 4:
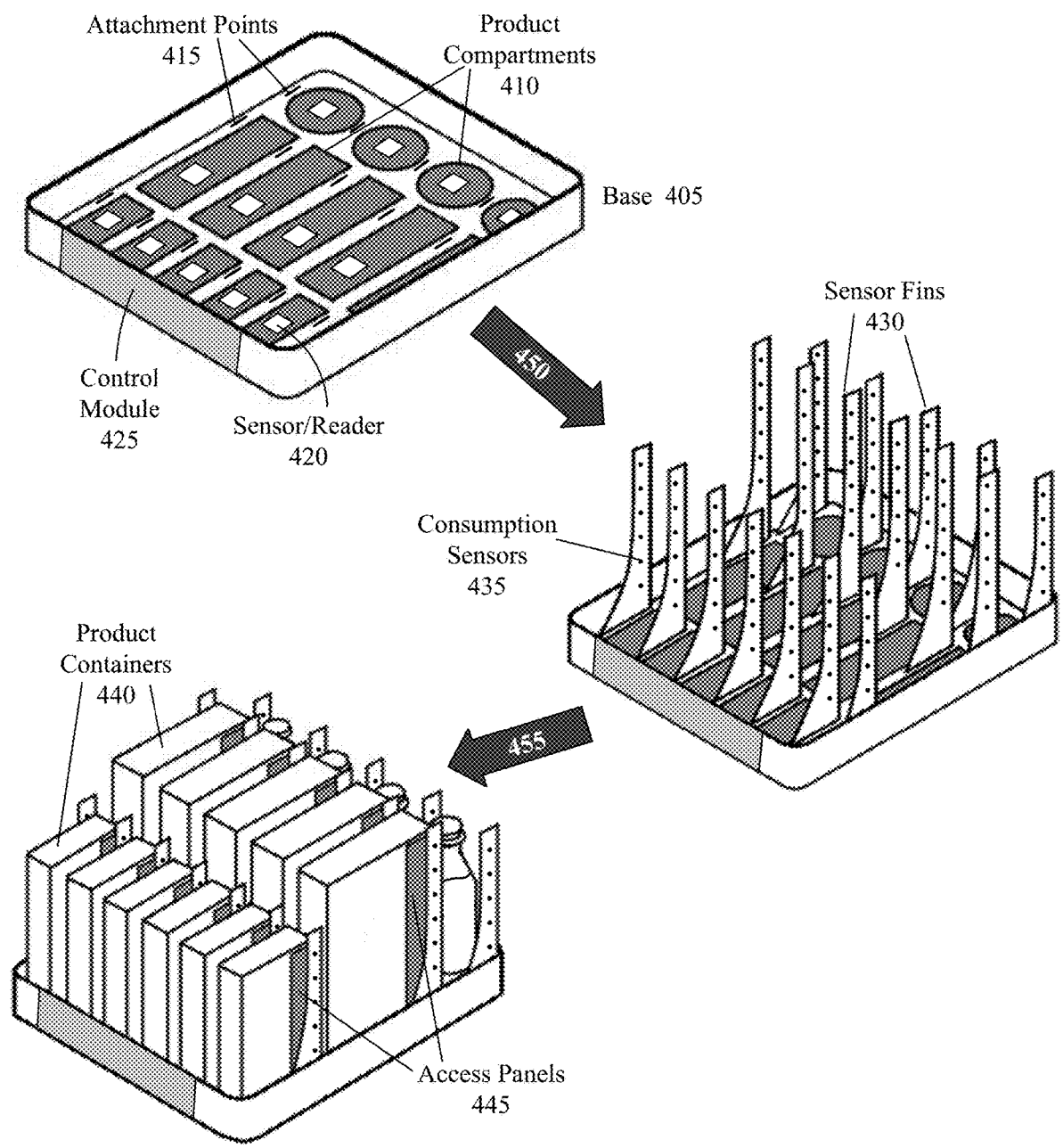
FIG. 4 can be a collection of illustrations depicting an example embodiment of the consumption-monitoring rack in accordance with embodiments of the inventive arrangements disclosed herein.

FIG. 4 can be a collection of illustrations depicting an example embodiment of the consumption-monitoring rack 400 in accordance with embodiments of the inventive arrangements disclosed herein. The example embodiment of the consumption-monitoring rack 400 can be used within the context of the consumption system of systems 100, 200, and 300.

The topmost illustration can show the base 405 of the consumption-monitoring rack 400. The base 405 can have a horizontal bottom and substantially vertical or diagonal sidewalls or siderails, as are common in the Art for racks 400. The base 405, and the rack 400 by extension, can come in a variety of sizes, shapes, and materials. Further, the thicknesses of the base's 405 bottom and sidewalls can also vary.

The bottom of the base 405 can be separated into multiple product compartments 410 shown in dark gray. In this example, the base 405 can have three rows of product compartments 410, each of a different size/shape—"short" rectangles, "long" rectangles, and circles. A sensor or reader 420 can be installed within the base 405 of each product compartment 410 to provide corresponding data for each product compartment 410 to the control module 425. The sensor/reader 420 can represent components of the product identification system and/or consumption sensors 435.

As an example, the sensor/reader 420 can be a bar code reader that scans the bar code on the product container 440 as it is placed in the product compartment 410, ensuring that the placed product container 440 matches the one that was removed (i.e., product containers 440 are kept in the same product compartments 410).

As another example, the sensor/reader 420 can be a weight sensor that captures the weight of the product container 440 occupying the product compartment 410. The weight data can be used in conjunction with the other consumption sensors 435 to monitor the consumption of the consumable product.

Additionally, a weight or other type of sensor 420 specific to a product compartment 410 can be better suited than other types of consumption sensors 435 for consumable products that come in single-serve product containers 440 like cans of soup. As an example, each can of soup can have a known weight. Therefore, the weight of soup cans in the product compartment 410 can indicate the quantity of cans.

The control module 425 of the consumption-monitoring rack 400 can be attached to and/or embedded within the sidewalls and/or bottom of the base 405. The placement of the components of the control module 425 can be distributed throughout the base 405, as necessary, with delicate components having additional protection. For example, it can be desired for a display element to face frontwards so it can be seen by the user, whereas a power cord should not extend from the front. Wires and/or circuitry connecting components like the sensor/readers 420 and consumption sensors 435 can be embedded during fabrication of the base 405.

Near the lateral sides of each product compartment 410, one or more attachment points 415 can exist for the coupling of sensor fins 430 as shown in the middle illustration, following arrow 450. In this example, the sensor fins 430 can be vertical extensions that house the consumption sensors 435. The sensor fins 430 can be integrated into the base 405 at the attachment points 415 and can have been removed from the topmost illustration to provide a clear view of the bottom of the base 405.

In another embodiment, the sensor fins 430 can be attached to or detached from the base 405 by the user. Such an embodiment can allow for different sizes and/or shapes of sensor fins 430 having different consumption sensors 435 configurations to be used with the base 405, increasing the different types of product container 440 sizes and/or shape that can be utilized with the consumption-monitoring rack 400. In such an embodiment, it can be important for the attachment points 415 to accommodate the connection of wiring so the consumption sensors 435 can receive power and communicate with the control module 425.

Each product compartment 410 and the product container 440 that occupies it can be flanked by a pair of sensor fins 430, as shown in the bottom illustration following arrow 455. This last illustration can show the consumption-monitoring rack 400 with each product compartment 410 occupied by a product container 440. As shown in this illustration, the consumption sensors 435 of the sensor fins 430 can align with the access panels 445 of the product containers 440. The sensor fins 430 can be positioned vertically or diagonally with reference to the horizontal plain of the rack so long as the fins are paired to permit volumetric measurements of the containers 440 being monitored.

It should be noted that only the box-like product containers 440 of this illustration can be shown as having access panels 445. The box-like product containers 440 can be made of cardboard which can block the consumption sensors' 435 access to the interior space. Cardboard box product containers 440 used with the consumption system can be required to be fabricated with cut-out sections that are covered with a transparent material like plastic. These cut-out section covered with plastic can be the access panels 445. Similar examples of these types of product containers 440 can been seen on the shelves of many grocery stores contain spaghetti, macaroni, and other types of dry pasta.

Product containers 440 that are already clear in part of their entirety like plastic or glass bottles of cooking oil can be considered as having inherent access panels 445 providing that the particular material is able to be adequately penetrated by the consumption sensors 435. As shown in the last illustration, the consumption-monitoring racks 400 can be ideal for personal use in a kitchen pantry, relieving the user from having to manually and repeatedly check the level of every consumable product.

Figure 5:
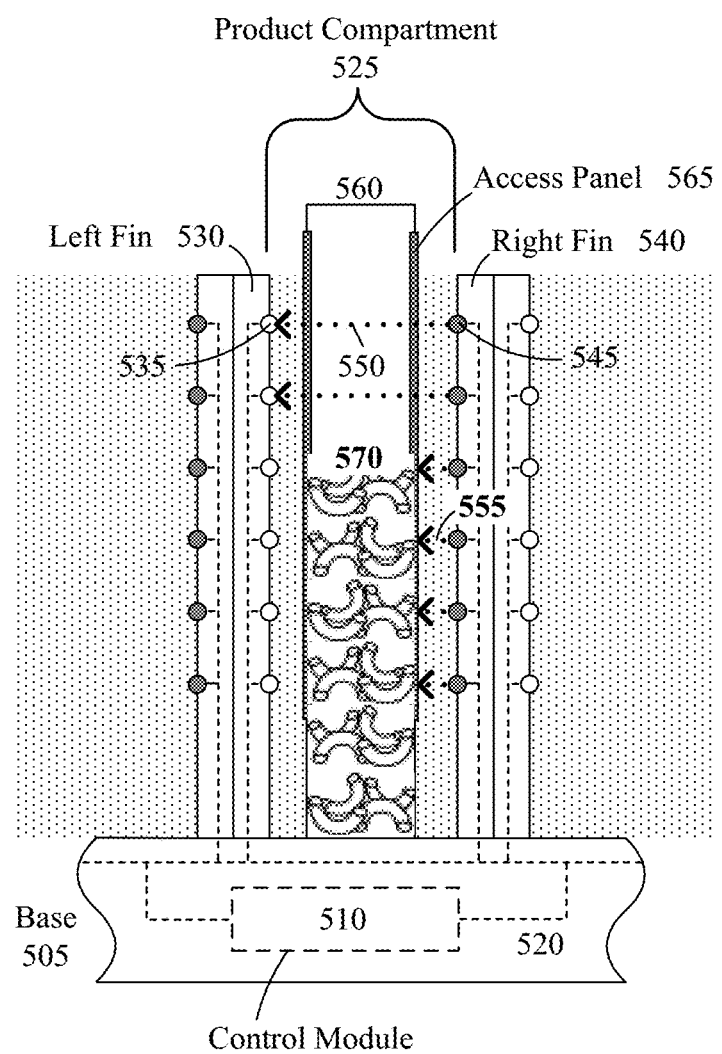
FIG. 5 is an enlarged cut-away illustration of the workings of an example embodiment of the consumption sensors on a product container within a product compartment of the consumption-monitoring rack in accordance with embodiments of the inventive arrangements disclosed herein.

FIG. 5 is an enlarged cut-away illustration 500 of the workings of an example embodiment of the consumption sensors 535 and 545 on a product container 560 within a product compartment 525 of the consumption-monitoring rack in accordance with embodiments of the inventive arrangements disclosed herein. The example embodiment of the consumption sensors 535 and 545 shown in illustration 500 can be used within the context of the consumption system of systems 100, 200, and 300 and consumption-monitoring rack 400.

Illustration 500 can be a front-view of a single product compartment 525 section of the consumption-monitoring rack. This section can include the base 505, product compartment 525 and sensor fins 530 and 540. As with previous embodiments of the consumption-monitoring rack, the base 505 can have elements of the control module 510 and connective wiring/circuitry 520 embedded and/or installed therein.

The product compartment 525 can have a left sensor fin 530 on one side and a right sensor fin 540 on the other side opposite to the left fin 530. Left and right can be used to differentiate between the two sensor fins 530 and 540 and can refer to the positioning of the sensor fins 530 and 540 with respect to the viewing plane of the illustration 500. The sensor fins 530 and 540 can be positioned vertically or diagonally with reference to the horizontal plain of the rack.

Since product compartments 525 of the same row in the consumption-monitoring rack are adjacent to at least one other product compartment 525, the left fin 530 of product compartment 525 can be positioned next to the right fin of the left-adjacent product compartment and the right fin 540 can be next to the left fin of the right-adjacent product compartment. It can be beneficial in such an arrangement to integrate the fins 530 and 540 of adjacent product compartment 525 into a single fin that contains the consumption sensors 535 and 545 for each. This can also increase the stability of the sensor fins 530 and 540 and the connection of the consumption sensors 535 and 545 to the internal wiring 520.

This example embodiment of the consumption sensors can utilize an array of electromagnetic (EM) emitters 545 embedded in the surface of the right fin 540 facing into the product compartment 525 and a corresponding array of EM sensors 535 embedded in the surface of the left fin 530 facing into the product compartment 525. Each emitter 545 can direct a beam of EM radiation 550 and 555 into the product compartment 525 towards their corresponding EM sensors 535.

An unbroken beam 550 can indicate that space between the EM emitter 545 and sensor 535 is unobstructed. For the purposes of the consumption-monitoring rack, this can be interpreted as the consumable products 570 in this space have been consumed. A broken beam 555 can indicate that the space between the EM emitter 545 and sensor 535 is obstructed. For the purposes of the consumption-monitoring rack, this can be interpreted as the consumable product 570 in this space have not been consumed.

Because of this simple interpretation of basic optics, the necessity for the product container 560 placed within the product compartment 525 having access panels 565 can become clear. Using a product container 560 that does not have access panels 565 can result in all the emitted beams 555 being blocked by the container 560 walls; access to the interior space of the product container 560 can allow the beams 550 and 555 to only be blocked by the consumable product 570 inside.

The more emitters 545 and corresponding sensors 535 used, the greater the precision of determining volumetric changes of the consumable product 570 can be achieved. Although the emitters 545 are shown as emitting beams 550 and 555 in parallel to each other, embodiments can be contemplated where the beams 550 and 555 are not parallel to each other and/or to a bottom/top of the product container 560.

Although light is the most common form of EM emissions, any electromagnetic radiation frequency can be used (with a corresponding emitters 545 and sensors 555) and this embodiment of the consumption sensors 535 and 545 need not be limited to a visible light range. In fact, non-visible emissions, such as infrared and ultraviolet can be preferable in some embodiments, where the visual beam indicators are distracting. In other embodiments, permitting one or more of the emitters 545 to be in the visual range can function as a simple way to test the emitters 545 and sensors 535 and their alignment. A single emitter 545 capable of broadcasting at different frequencies can be used in more robust embodiments where the control module 510 is configured to switch the emitter 545 between frequencies for different modes (e.g., an alignment mode or an in-use mode).

Figure 6:
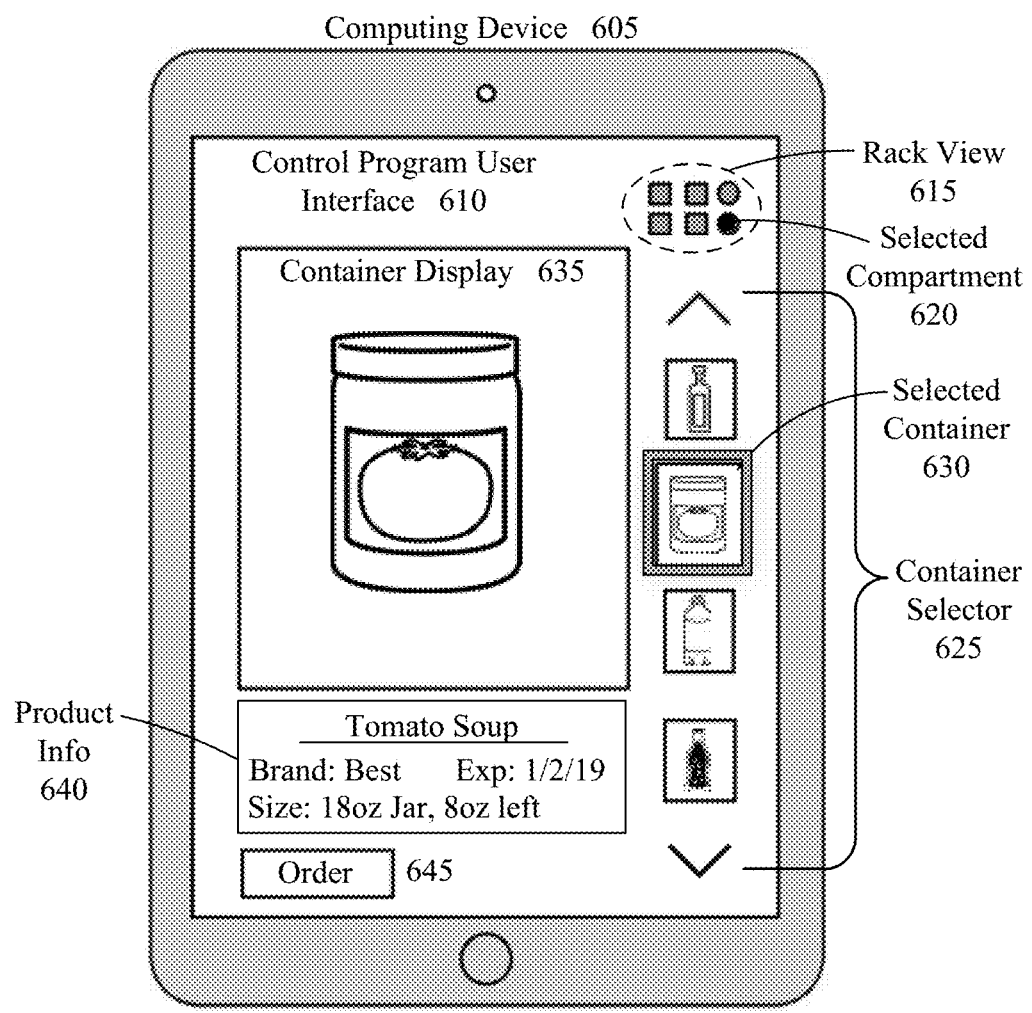
FIG. 6 presents an example user interface for the control program of the consumption system in accordance with embodiments of the inventive arrangements disclosed herein.

FIG. 6 presents an example user interface 610 for the control program of the consumption system in accordance with embodiments of the inventive arrangements disclosed herein. This user interface 610 can be utilized within the context of systems 100, 200, and 300.

User interface 610 can run and be presented upon the computing device 605. Depending upon the implementation of the consumption system, computing device 605 can be a device included with the consumption system preconfigured with the control program or can be the user's device having the control program installed thereon. In this example, the computing device 605 can be a tablet computer having the components and functionalities common in the Art.

The user interface 610 can be a graphical user interface (GUI) that presents the user with a variety of data about and actions to perform with regards to the associated consumption-monitoring racks. It should be noted that the user interface 610 of this example can show only a subset of possible data view and actions.

The main elements presented in this user interface 610 can include a rack view 615, a container selector 625, a container display 635, a product information area 640, and an order button 645. The rack view 615 can provide the user with a top-down view of the consumption-monitoring rack being explored in the control program by the user. The rack view 615 can utilize shapes to present a simple map of the product compartments of a consumption-monitoring rack with the product compartment 620 currently selected being graphically differentiated, darkened in this example.

The selected compartment 620 can highlight its corresponding container 630 in the container selector 625 area, as a one-to-one relationship can exist between a product compartment 620 and the product container 630 that occupies it. The container selector 625 can be a control mechanism that allows the user to navigate and select a product container 630.

The product container 630 selected in the container selector 625 can present a picture, graphic, and/or video of the container 630 in the container display 635. The data presented in the container display 635 can be obtained from a variety of sources, including, but not limited to, an Internet search for the product container 630 and/or its consumable product, a Web site associated with the product container 630 and/or its consumable product, a photo taken by the user of the product container 630, an image of the product container 630 captured by the consumption system, and the like.

Information about the consumable product stored within the product container 630 can be presented in the product information area 640. The data shown in the product information area 640 can be based upon basic data and consumption data collected by the consumption system via the product identification system and/or consumption sensors. In this example, the brand, size, and expiration date of the product container 630 can be obtained by the product identification system reading its product identifier. The amount of soup remaining in the product container 630 can be calculated by subtracting the current measurements from the consumption sensors from the maximum amount of the consumable product, which is already known.

In another embodiment, the product information area 640 and container display 635 can be combined into a single display area.

The order button 645 can allow the user to override existing repurchasing rules for the selected product container 630. This can be useful when the user has additional consumption or forecast knowledge. For example, the user can be planning to serve grilled cheese sandwiches and tomato soup for a luncheon in two weeks. The quantity of tomato soup that the user needs can be far more than their usual consumption. Thus, the user can use the order button 645 to purchase additional jars of tomato soup to fulfill their projected consumption need.

The diagrams in the Figures illustrate the architecture, functionality, and operation of possible implementations of systems and methods according to various embodiments of the present invention. It will also be noted that each block of the block diagrams and combinations of blocks in the block diagrams can be implemented by special purpose hardware-based systems that perform the specified functions or acts, or combinations of special purpose hardware and computer instructions.

What is claimed is:
1. A consumption-monitoring storage system comprising:
   at least one consumption-monitoring rack having a flat horizontal base and substantially vertical or diagonal sidewalls or siderails or diagonal or siderails, wherein said at least one consumption-monitoring rack measures a volumetric level of a consumable product for each product container occupying at least one consumption-monitoring rack, wherein each product container has at least two transparent sections or windows positioned opposite each other that provide access to its respective interior volumetric space and the consumable product, allowing measurement of the volumetric level of the consumable product within the interior volumetric space by volume-sensing components, said consumption-monitoring rack further comprising:

an electromagnetic (EM) emitter array for emitting a plurality of beams of one of visible light, infrared emissions, and ultraviolet emissions without beam overlap between adjacent emitters of the array; and an electromagnetic (EM) sensor array for detecting emissions of the plurality of beams, wherein one emitter of the EM emitter array corresponds to one sensor of the EM sensor array in a one-to-one fashion, wherein EM emitter array and the EM sensor array are positioned to align with the at least two transparent sections or windows, referred to as access panels, as in absence of the access panels material of the product container would block the consumption center's access to the interior space such that the EM sensor is not able to detect emissions of a corresponding one of the beams emitted by a corresponding one of the EM emitter of the EM emitter array, wherein measurement of the volumetric level of consumable product within the product container is based on a quantity of uninterrupted beams and a quantity of interrupted beams emitted by the emitters of the EM emitter array and received by respective sensors of the EM sensor array;

a control program running on a computing device located proximate or remotely to and configured to communicate with at least one consumption-monitoring rack, receiving volumetric level measurements for each product container occupying at least one consumption-monitoring rack and automatically repurchasing consumable products on behalf of and as defined by at least one human agent responsive to volumetric levels of said consumable products in their respective product containers or packaging being reduced to predefined thresholds.

2. The storage system of claim 1, wherein the control program monitors consumption behavior of a user over time and automatically adjusts the predefined threshold to ensure that the respective consumable products are automatically repurchased and delivered prior to being expended.

3. The storage system of claim 1, wherein at least one consumption-monitoring rack further comprises:

a plurality of product compartments defining discrete sections of the horizontal base, wherein each product compartment is of a size and a shape to hold a product container of a substantially commensurate size and shape;

a pair of sensor fins for each product compartment vertically coupled to the horizontal base and positioned opposite to each other, wherein each pair of sensor fins houses consumption sensors, including the EM emitter array and the EM sensor array, for measuring the volumetric level of the consumable product within the product container that occupies a respective product compartment, between the pair of sensor fins, wherein at least two transparent sections of the product container align with the consumption sensors;

a product identification system, installed upon or within the base, configured to access identifying data encoded in a product identifier present on each product container to identify the consumable product stored therein, wherein said identifying data at least comprises a name of the consumable product; and a control module installed within at least one of the horizontal base and vertical or diagonal sidewalls or siderails, said control module at least comprising:

a processor;

a transceiver for wirelessly communicating data with the control program running on the computing device;

a non-transitory storage medium for storing programmatic instructions for monitoring volumetric levels of consumable products within product containers that occupy the plurality of product compartments and data including the predefined thresholds;

a power supply;

circuitry connecting elements of the control module, the consumption sensors in each pair of sensor fins, and the product identification system.

4. The storage system of claim 1, wherein the
electromagnetic (EM) emitter array emits the beams that are vertically distributed along a first sensor fin of the pair; and wherein the electromagnetic (EM) sensor array detects the beams that are vertically distributed along a second sensor fin of the pair.

5. The storage system of claim 3, wherein the product identification system comprises one of a bar code reader that reads a bar code product identifier, a radio-frequency identification (RFID) reader that reads a RFID tag product identifier, and a near-field communication (NFC) device that reads a NFC tag or sticker product identifier.

6. The storage system of claim 1, wherein the control program associates each occupied product compartment with the identifying data of the consumable product as obtained by the product identification system from the product identifier on the respective product container.

7. The storage system of claim 1, wherein the control program calculates and stores deltas between sequential measurements of the volumetric level of the consumable product within each product container over time to compute a rate of consumption for each consumable product and product container.

8. The storage system of claim 1, wherein the control program interoperates with a remotely-located consumption server to effectuate the automatic repurchasing of consumable products, wherein the control program conveys a unique identifier for each consumable product being repurchased to the consumption server, wherein the consumption server conveys a chargeable payment source, shipping method preferences, and a delivery address to an online marketplace.

9. The storage system of claim 1, wherein the product container is made from cardboard, wherein at least two transparent sections are cutouts in the cardboard covered with a clear material.

10. The storage system of claim 1, wherein the product container is a made from a clear material comprising one of glass, plastic, acrylic, and resin, wherein at least two transparent sections are walls of the product container.

11. A consumption-monitoring storage system comprising:

at least one consumption-monitoring rack having a flat horizontal base and substantially vertical or diagonal sidewalls or siderails, each consumption-monitoring rack comprising:

a plurality of product compartments defining discrete sections of the horizontal base, wherein each product compartment is of a size and a shape to hold a product container of a substantially commensurate size and shape, wherein each product container has at least two vertical transparent sections positioned opposite each other that provide access to its respective interior volumetric space and a consumable product stored therein;

a pair of sensor fins for each product compartment vertically coupled to the horizontal base and positioned opposite to each other, wherein each pair of sensor fins houses consumption sensors for measuring a volumetric level of the consumable product within the product container that occupies a respective product compartment, between the pair of sensor fins, wherein the consumption sensors are aligned with at least two transparent sections of the product container wherein each pair of sensor fins comprises:

an electromagnetic (EM) emitter array for emitting a plurality of beams of one of visible light, infrared emissions, and ultraviolet emissions without beam overlap between adjacent emitters of the array; and an electromagnetic (EM) sensor array for detecting emissions of the plurality of beams, wherein one emitter of the EM emitter array corresponds to one sensor of the EM sensor array in a one-to-one fashion, wherein EM emitter array and the EM sensor array are positioned to align with the at least two transparent sections, referred to as access panels, as in absence of the access panels material of the product container would block the consumption center's access to the interior space such that the EM sensor is not able to detect emissions of a corresponding one of the beams emitted by a corresponding one of the EM emitter of the EM emitter array, wherein measurement of the volumetric level of consumable product within the product container is based on a quantity of uninterrupted beams and a quantity of interrupted beams emitted by the emitters of the EM emitter array and received by respective sensors of the EM sensor array;

a product identification system, installed upon or within the base, configured to access identifying data encoded in a product identifier present on each product container to identify the consumable product stored therein, wherein said identifying data at least comprises a name of the consumable product;

a control module installed within at least one of the horizontal base and vertical or diagonal sidewalls or siderails for monitoring volumetric levels of consumable products within product containers that occupy the plurality of product compartments, wherein the control module is capable of wireless communication; and a control program running on a computing device located proximate to at least one consumption-monitoring rack so as to effectuate wireless communications between the control module and the computing device, wherein said control program receives volumetric level measurements for each product container occupying at least one consumption-monitoring rack and automatically repurchases consumable products, as identified by the product identification system, on behalf of and as defined by at least one human agent responsive to the volumetric levels of said consumable products in their respective product containers being reduced to predefined thresholds.

12. The storage system of claim 11, wherein the electromagnetic (EM) emitter array emits the beams that are vertically distributed along a first sensor fin of the pair; and
wherein the electromagnetic (EM) sensor array detects the beams that are vertically distributed along a second sensor fin of the pair.

13. The storage system of claim 11, wherein the product identification system comprises one of a bar code reader that reads a bar code product identifier, a radio-frequency identification (RFID) reader that reads a RFID tag product identifier, and a near-field communication (NFC) device that reads a NFC tag or sticker product identifier.

14. The storage system of claim 11, wherein the control program associates each occupied product compartment with the identifying data of the consumable product as obtained by the product identification system from the product identifier on the respective product container.

15. The storage system of claim 11, wherein the control program interoperates with a remotely-located consumption server to effectuate the automatic repurchasing of the consumable products, wherein the control program conveys data from the product identifier for each consumable product being repurchased to the consumption server, wherein the consumption server conveys a chargeable payment source, shipping method preferences, and a delivery address to an online marketplace.

16. The storage system of claim 11, wherein the control program calculates and stores deltas between sequential measurements of the volumetric level of the consumable product within each product container over time to compute a rate of consumption for each consumable product and product container.

17. A consumption-monitoring rack comprising:
a flat horizontal base with substantially vertical or diagonal sidewalls or siderails;

a plurality of product compartments defining discrete sections of the horizontal base, wherein each product compartment is of a size and a shape to hold a product container of a substantially commensurate size and shape, wherein each product container has at least two vertical transparent sections positioned opposite each other that provide access to its respective interior volumetric space and a consumable product stored therein;

a pair of sensor fins for each product compartment vertically coupled to the horizontal base and positioned opposite to each other, wherein each pair of sensor fins houses consumption sensors for measuring a volumetric level of the consumable product within the product container that occupies a respective product compartment, between the pair of sensor fins, wherein the consumption sensors are aligned with at least two transparent sections of the product container wherein each pair of sensor fins comprises:

an electromagnetic (EM) emitter array for emitting a plurality of beams of one of visible light, infrared emissions, and ultraviolet emissions without beam overlap between adjacent emitters of the array; and an electromagnetic (EM) sensor array for detecting emissions of the plurality of beams, wherein one emitter of the EM emitter array corresponds to one sensor of the EM sensor array in a one-to-one fashion, wherein EM emitter array and the EM sensor array are positioned to align with the at least two transparent sections, referred to as access panels, as in absence of the access panels material of the product container would block the consumption center's access to the interior space such that the EM sensor is not able to detect emissions of a corresponding one of the beams emitted by a corresponding one of the EM emitter of the EM emitter array, wherein measurement of the volumetric level of consumable product within the product container is based on a quantity of uninterrupted beams and a quantity of interrupted beams emitted by the emitters of the EM emitter array and received by respective sensors of the EM sensor array;

a product identification system, installed upon or within the base, configured to access identifying data encoded in a product identifier present on each product container to identify the consumable product stored therein, wherein said identifying data at least comprises a name of the consumable product; and a control module installed within at least one of the horizontal base and vertical or diagonal sidewalls or siderails for monitoring volumetric levels of consumable products within product containers that occupy the plurality of product compartments, wherein the control module is capable of wirelessly conveying the volumetric levels to a computing device running a control program, wherein said control program automatically repurchases consumable products, as identified by the product identification system, on behalf of and as defined by a human agent responsive to the volumetric levels of said consumable products in their respective product containers being reduced to predefined thresholds.

18. The consumption-monitoring rack of claim 17, wherein the
electromagnetic (EM) emitter array emits the beams that are vertically distributed along a first sensor fin of the pair; and
wherein the electromagnetic (EM) sensor array detects the beams that are vertically distributed along a second sensor fin of the pair.

19. The consumption-monitoring rack of claim 17, wherein the product identification system comprises one of a bar code reader that reads a bar code product identifier, a radio-frequency identification (RFID) reader that reads a RFID tag product identifier, and a near-field communication (NFC) device that reads a NFC tag or sticker product identifier.

20. The consumption-monitoring rack of claim 17, wherein the control program interoperates with a remotely-located consumption server to effectuate the automatic repurchasing of the consumable products, wherein the control program conveys the data from the product identifier for each consumable product being repurchased to the consumption server, wherein the consumption server conveys a chargeable payment source, shipping method preferences, and a delivery address to an online marketplace.

* * * * *